US008958558B2

(12) United States Patent
Eisen et al.

(10) Patent No.: US 8,958,558 B2
(45) Date of Patent: Feb. 17, 2015

(54) CONDITIONAL ENTITLEMENT PROCESSING FOR OBTAINING A CONTROL WORD

(75) Inventors: Philip Allan Eisen, Ottawa (CA); Ettore Benedetti, Leiden (NL); Arnoud Evert Van Foreest, Leiden (NL); Andrew Augustine Wajs, Haarlem (NL)

(73) Assignee: Irdeto B.V., Hoofddorp (NL)

( * ) Notice: Subject to any disclaimer, the term of this patent is extended or adjusted under 35 U.S.C. 154(b) by 538 days.

(21) Appl. No.: 12/715,047

(22) Filed: Mar. 1, 2010

(65) Prior Publication Data

US 2010/0251285 A1  Sep. 30, 2010

(30) Foreign Application Priority Data

Mar. 2, 2009 (EP) .................................... 09154129
Mar. 12, 2009 (EP) .................................... 09155007
Feb. 19, 2010 (EP) .................................... 10154151

(51) Int. Cl.
| | | |
|---|---|---|
| *H04L 29/06* | (2006.01) | |
| *H04N 7/16* | (2011.01) | |
| *H04N 21/4623* | (2011.01) | |
| *H04N 21/6334* | (2011.01) | |
| *H04L 9/08* | (2006.01) | |

(52) U.S. Cl.
CPC ........... *H04N 7/163* (2013.01); *H04N 21/4623* (2013.01); *H04N 21/63345* (2013.01); *H04L 9/0836* (2013.01); *H04L 9/0891* (2013.01); *H04L 2209/60* (2013.01)
USPC ........................................................ 380/239

(58) Field of Classification Search
None
See application file for complete search history.

(56) References Cited

U.S. PATENT DOCUMENTS

| | | |
|---|---|---|
| 7,110,548 B1 | 9/2006 | Ougi |
| 7,742,599 B2 * | 6/2010 | Candelore ..................... 380/210 |
| 7,970,138 B2 * | 6/2011 | Cocchi et al. ................. 380/200 |
| 2002/0106086 A1 | 8/2002 | Kamiya |
| 2003/0123665 A1 | 7/2003 | Dunstan et al. |
| 2006/0047601 A1 | 3/2006 | Peterka |
| 2006/0059506 A1 * | 3/2006 | Farre et al. ..................... 725/25 |
| 2006/0153377 A1 | 7/2006 | Arditti Modiano |
| 2006/0184796 A1 | 8/2006 | Fahrny |

(Continued)

FOREIGN PATENT DOCUMENTS

| | | |
|---|---|---|
| CN | 1984312 A | 6/2007 |
| EP | 0899956 A2 | 3/1999 |

(Continued)

OTHER PUBLICATIONS

"European Application No. 09154129.2, European Search Report dated Apr. 28, 2009", 6 pgs.

(Continued)

*Primary Examiner* — Michael R Vaughan
(74) *Attorney, Agent, or Firm* — Marc S. Kaufman; Reed Smith LLP (57) ABSTRACT

Embodiments of the invention provide an improved method and an improved receiver for obtaining a control word. Two or more subkeys are obtained in a receiver. Each subkey was encrypted under control of a key received in an entitlement message or transformed under control of a seed received in an entitlement message. After decryption or transformation, the subkeys are combined to obtain the control word. Typically at least one of the entitlement messages is a positive entitlement message and at least one of the entitlement messages is a negative entitlement message. Embodiments of the invention can be used in a conditional access system such as a Pay-TV system.

16 Claims, 6 Drawing Sheets

(56) References Cited

U.S. PATENT DOCUMENTS

| | | | |
|---|---|---|---|
| 2007/0242829 A1* | 10/2007 | Pedlow | 380/277 |
| 2008/0044019 A1* | 2/2008 | Junod | 380/228 |
| 2008/0101611 A1 | 5/2008 | Lindholm | |
| 2008/0152134 A1* | 6/2008 | Asano | 380/45 |
| 2008/0205643 A1* | 8/2008 | Chen | 380/205 |
| 2008/0219643 A1* | 9/2008 | Le Buhan et al. | 386/95 |
| 2008/0276083 A1* | 11/2008 | Tronel et al. | 713/150 |
| 2009/0028327 A1* | 1/2009 | Pinder | 380/212 |
| 2009/0285401 A1* | 11/2009 | Moroney et al. | 380/278 |
| 2010/0235624 A1* | 9/2010 | Candelore | 713/155 |
| 2011/0145577 A1* | 6/2011 | Fahrny | 713/168 |

FOREIGN PATENT DOCUMENTS

| | | |
|---|---|---|
| EP | 1035684 A2 | 9/2000 |
| EP | 1496642 A1 | 12/2005 |
| JP | H08-23313 A | 1/1996 |
| JP | H10-232606 A | 9/1998 |
| JP | H11155138 A | 6/1999 |
| JP | 2003153227 A | 5/2003 |
| JP | 2003309545 A | 10/2003 |
| JP | 2005020218 A | 1/2005 |
| JP | 2005049925 A | 2/2005 |
| JP | 2005203837 A | 7/2005 |

OTHER PUBLICATIONS

"European Application No. 09155007.9, European Search Report dated Apr. 24, 2009", 6 pgs.

Menezes, A. J., "Handbook of applied cryptography", (1997), 7 pgs.

* cited by examiner

CONDITIONAL ENTITLEMENT PROCESSING FOR OBTAINING A CONTROL WORD

CLAIM OF PRIORITY

The present patent application claims priority under 35 U.S.C. 119 to European Patent Application (EPO) No. 09154129.2 filed Mar. 2, 2009, and to European Patent Application (EPO) No. 09155007.9 filed Mar. 12, 2009, and to European Patent Application (EPO) No. 10154151.4 filed Feb. 19, 2010, the entire contents of which are incorporated herein by reference.

FIELD OF THE INVENTION

The present invention relates to a method in a receiver for obtaining a control word and a receiver for obtaining a control word. More specifically the invention relates to a method and a receiver in a conditional access system such as e.g. a Pay-TV system.

BACKGROUND

Conditional access applications, such as Pay-TV applications, use receivers for securely processing entitlements and storing decryption keys. Keys are typically organized in a key management structure with several layers. Each layer is used to deliver keys at a lower level layer. Keys are renewed to control access to the encrypted content. Keys for decrypting Pay-TV content are known as control words CW.

An entitlement message from a head-end system that provides a receiver with a new key value is called a positive entitlement. Positive entitlements, e.g. entitlement control messages (ECM), are typically secured and disadvantageously can introduce a significant bandwidth overhead. A negative entitlement is an entitlement message, e.g. an entitlement management message (EMM), that instructs a receiver to revoke and no longer use a particular key, resulting in the receiver being unable to decrypt Pay-TV content. Conditional access systems typically use a mixture of positive and negative entitlements. If the receiver blocks or removes the negative entitlement, it disadvantageously becomes possible for the receiver to use a non-authorized key for decrypting content.

Traditionally, Pay-TV implementations rely on hardware tamper resistance to protect the storage of cryptographic keys and to ensure the unmodified processing of entitlement messages. Examples of tamper resistant hardware are smart cards and secure computing chip devices embedded in Digital TV receivers. The increasing advances in chip manufacturing and the associated cost reductions makes it desirable for Pay-TV implementations to remove such special hardware components.

Pay-TV solutions are known that do not require specific tamper resistant chips. Such solution use software tamper resistance to protect the key storage and entitlement processing steps in a Digital TV receiver. Software tamper resistance technology is used in DRM systems for PCs, Mobile Telephones and IPTV devices.

SUMMARY OF THE INVENTION

It is an object of the invention to provide an improved solution for conditional entitlement processing, wherein revocation of a control word cannot be blocked by a receiver and which can be used in both hardware tamper resistance environments and software tamper resistance environments.

According to an aspect of the invention a method in a receiver is proposed for obtaining a control word. The method comprises the step of obtaining two or more subkeys each under control of entitlement data received in a subkey specific entitlement message from a head-end system. The method further comprises the step of combining the subkeys to obtain the control word.

According to an aspect of the invention a receiver is proposed for obtaining a control word. The receiver comprises an input module configured for receiving two or more subkey specific entitlement messages. Each subkey specific entitlement message comprises entitlement data for a subkey. The receiver further comprises a processor configured to obtain two or more subkeys each under control of the respective entitlement data. The processor is further configured to combine the subkeys to obtain the control word.

Each subkey specific entitlement message comprises entitlement data for a specific subkey. "Under control of entitlement data" means that the entitlement data is used in the obtainment of the subkey and that—depending on the content of the entitlement data—the obtained subkey is either valid or invalid. Valid subkeys can be combined to obtain a valid control word. An invalid subkey results in the control word becoming not obtainable or in the obtainment of an invalid control word. The entitlement data is e.g. a decryption key for decrypting an encrypted subkey or a seed (or compound) for transforming a transformed subkey.

As there is no entitlement message with entitlement data directly controlling the validity of a control word, the receiver cannot block such entitlement message to thereby block a revocation of the control word. Instead, two or more subkeys—each under control of entitlement data received in a subkey specific entitlement message—are processed to obtain the control word. Thus, the invention advantageously prevents the receiver from blocking revocation of a control word by blocking an entitlement message.

The obtained control word can subsequently be used to decrypt encrypted content such as e.g. Pay-TV content.

All entitlement messages can be received from a single head-end system. Alternatively the entitlement messages are received from two or more head-end systems.

The embodiments of claims 2 and 10 advantageously enable revocation of a control word for a single receiver or a group of receivers.

The embodiments of claims 3 and 11 advantageously enable a more efficient revocation of a control word for a single receiver or a group of receivers.

The embodiments of claims 4 and 12 advantageously enable the invention in a receiver using hardware tamper resistance.

The embodiments of claims 5 and 13 advantageously enable the invention not only for the control word but also for decryption keys used in the process of obtaining the subkeys.

The embodiments of claims 6 and 14 advantageously enable the invention in a receiver using software tamper resistance.

The embodiments of claims 7 and 15 advantageously enable the invention not only for the control word but also for seeds used in the process of obtaining the subkeys.

The embodiments of claims 8 and 16 advantageously enable compatibility with existing decryption and content decoding chipsets.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

Conditional access systems employing e.g. Pay-TV applications rely on the encryption of the content data streams. Receivers (also referred to as set-top boxes or STBs) need the relevant keys to decrypt the stream prior to decoding. A key management system in a head-end system manages and controls access to the encrypted content in the receiver. In current semiconductor chip devices, the bulk decryption of the content stream is performed in a dedicated hardware circuit. In addition, such chips can contain a standard symmetric encryption circuit with specific key management facilities.

Figure 1:
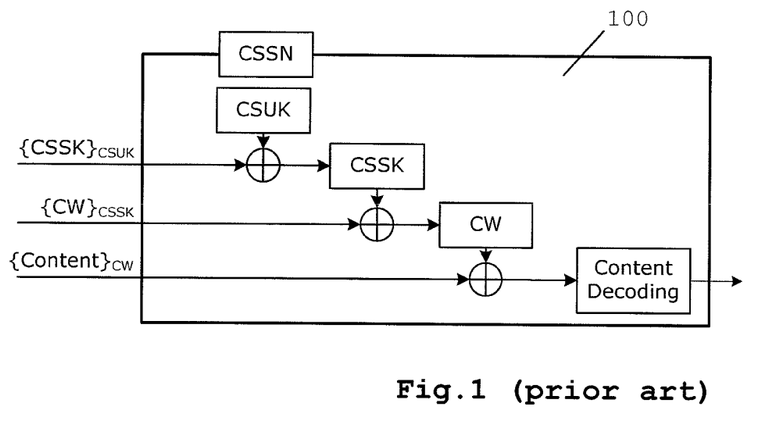
FIG. 1 shows a chipset and its hardware functions of a prior art Pay-TV application.

FIG. 1 shows an example of a prior art chipset and its hardware functions related to a Pay-TV application. The hardware decryption block 100 of the chip contains memory storage for the following keys: Chip Set Session Key CSSK, Chip Set Serial Number (also known as Public Chip Identifier) CSSN, Chip Set Unique Key CSUK and Control Word CW. Both the CSSN and the CSUK are typically stored in One Time Programmable Memory during the manufacturing process. The values cannot be modified after the initial programming step. The Chip Manufacturer burns a unique CSSN and CSUK into each chip. The CSSN and CSUK are generated by the Pay-TV application provider. The CSSN is externally accessible but the CSUK is only available for use within the device. The CSSK is loaded into the chipset in the encrypted form $\{CSSK\}_{CSUK}$. The chipset decrypts the encrypted CSSK with the CSUK and stores it for further use in the decryption hardware. The $\{CSSK\}_{CSUK}$ is stored in non-volatile memory of the STB. At power-up the STB fetches the $\{CSSK\}_{CSUK}$ data to load the CSSK into the chip. The CSSK is used to load a Control Word (CW) in the encrypted form $\{CW\}_{CSSK}$. The chip descrambles the data with the CSSK and stores the CW for use in the descrambling of the protected content stream in the module Content Decoding. Each STB uses a unique CSSK to prevent sharing of the bulk descrambling key, i.e. the CW, over the internet or any other communication infrastructure.

The key management infrastructure and tamper resistance primitives are designed to load a common CW into a bulk datastream descrambler (e.g. TDES, DVB-CSA or AES), but limit the access to the CW to only authorized devices.

Figure 2A:
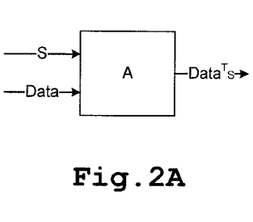
FIG. 2A shows a block diagram of an apply primitive as used in a software tamper resistance solution of an exemplary embodiment of the invention.
Figure 2B:
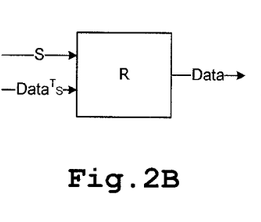
FIG. 2B shows a block diagram of a remove primitive as used in a software tamper resistance solution of an exemplary embodiment of the invention.
Figure 2C:
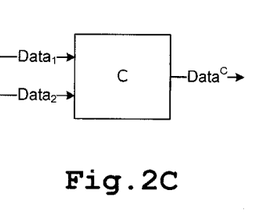
FIG. 2C shows a block diagram of a condition primitive as used in a software tamper resistance solution of an exemplary embodiment of the invention.

Software tamper resistance technology uses basic primitives to obscure software code transformations. The software tamper resistance solution of the invention uses three basic primitives: "Apply", "Remove" and "Condition". FIG. 2A, FIG. 2B and FIG. 2C show a block diagram of the apply primitive A, the remove primitive R and the condition primitive C, respectively. The notation $A(D,S)=A_S(D)=D^{TS}$ describes the "Apply" step which transforms a data element D according to a parameter "seed" S. The notation $R(D^{TS},S)=R_S(D^{TS})=D$ describes the "Remove" step that reverses the transformation of a data element D based on a "seed" S. The seeds need to be identical for the two functions A( ) and R( ) to become the inverse of each other. The data D and $D^{TS}$ that is processed by the Apply and Remove steps are of the same size (number of bytes). The third primitive $C(D_1,D_2)=C_{D1}(D_2)=D^{CS}$ is a conditional transform where the output is a correlation of the two inputs. Again, the primitive preserves the size of the input data.

A further element of the software tamper resistance primitive is that the seed S is constructed from a mixture of multiple input parameters. This makes it difficult to extract the individual data elements from the input data. The parameter mixing functions are denoted as: $f(A,B)=<A,B>$. The function result $<A,B>$ is called the "compound" of A and B. The size of the compound (in bytes) is larger than the combined size of the input parameters A and B.

The primitives can be combined to provide the basic steps to implement the key management functions required for Conditional Access systems. The combination produces a new operation and the individual steps are no longer visible within the new function block. There are two instances that are used in the key management: a combination of Remove and Apply primitives and a secure correlation of compounds.

Figure 2D:
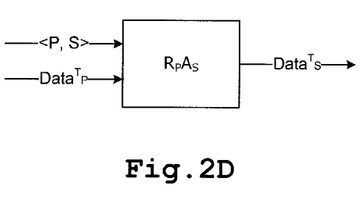
FIG. 2D shows a block diagram of a combination of Remove and Apply primitives as used in a software tamper resistance solution of an exemplary embodiment of the invention.

FIG. 2D shows the instance of a combination of Remove and Apply primitives. The transformation uses a compound <P,S> into a combined Remove and Apply operation. The $R_P A_S$ block modifies the Data by replacing a transformation using the seed P with a transformation using the seed S. Note that all the interfaces of the block are either transformed or a compound. This means that the operation occurs on transformed data and produces transformed data. Hence the function takes place in transformed domain spaces and reveals no "cleartext" version of the parameters on any of the interfaces. The function used to produce the compound <P,S> is unique and linked to the implementation of the combined apply and remove operation.

Figure 2E:
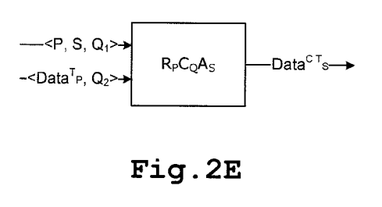
FIG. 2E shows a block diagram of a secure correlation of compounds as used in a software tamper resistance solution of an exemplary embodiment of the invention.

FIG. 2E shows the instance of a secure correlation of compounds. It is used for Conditional Entitlement Processing and is a combination of all three basic primitives. The conditional block is combined with remove and apply blocks $R_p A_s$ to perform a secure correlation of compounds.

The main effect of the apply and remove primitives is that it enables operations on transformed data using transformed parameters. Hence, monitoring of the inputs will not reveal any useful information. The implementation of the software tamper resistance primitives makes it very hard to obtain the actual values of the relevant data. In traditional conditional access processing the entitlements are processed using cleartext keys and the result produces yet another cleartext key. The cleartext key is stored in a cleartext form in a non volatile memory of the smart card, which memory is hardware tamper resistant. In the software tamper resistance approach the keys are stored in the form of a "compound" and the entitlement processing produces yet another entitlement (in the form of a transformed key).

The Content Receiver hardware provides a secure mechanism to load the system wide CW into the chip used to convert the protected content stream into a decoded format. An example of such mechanism has been discussed with FIG. 1. The encrypted form is unique for each receiver. The secret CSSK (or the CSUK) is required to load CWs into the receiver/chip. The entitlement processing involves the encryption of the CW with the local CSSK using the software tamper resistance primitives. As the interfaces between the basic primitives can be easily monitored by an attacker, these communication paths should be secure. This is achieved by the transformation steps using the "Apply" and "Remove" operations. The interfaces only carry compounds which protect the information contained in it.

Figure 3:
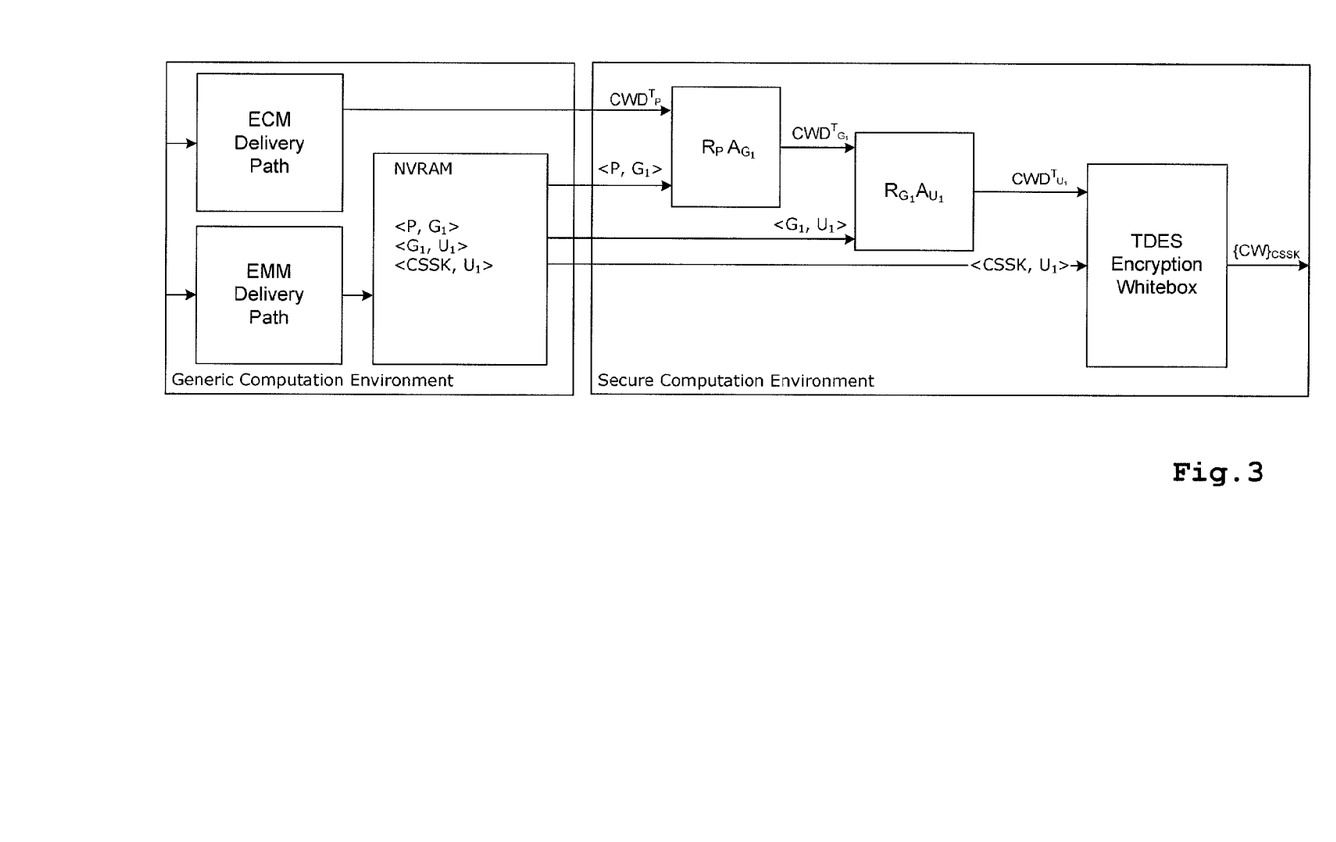
FIG. 3 shows Conditional Access key processing in a receiver using positive entitlements.

FIG. 3 shows a diagram of the basic Conditional Access key processing in a receiver using positive entitlements. In this example, the basic Conditional Access processing is divided in two basic parts: a secure computation environment and a generic processing environment. The generic processing environment deals with the external interfaces such as storage, data communication and user interaction. The secured computation environment deals with the processing of keys and/or seeds. The processing is performed by one or more processors (not shown). The ECM Delivery Path is used for the reception of entitlement control messages (ECM) from a head-end system. The ECM comprises an encrypted or transformed CW. The EMM Delivery Path is used for the reception of entitlement management messages (EMM) from the head-end system. The EMM comprises keys or seeds for decrypting or transforming the encrypted or transformed CW. The ECM Delivery Path and EMM Delivery Path are typically implemented in an input module for receiving the ECMs and EMMs. The software tamper resistance primitives have inputs and outputs which are not useful to an attacker. In the example of FIG. 3 a two layer key hierarchy is used. The "Remove" operation on the transformed control word $CWD^{TP}$ requires P, which is distributed in a compound, tied with G1. In turn, G1 is distributed in a compound, tied with U1. After the two Remove/Apply operations, the final step is to encrypt the transformed control word $CWD^{TU}$ in the TDES Encryption Whitebox module using a receiver specific key such as a chip set session key CSSK. The CSSK is typically provided in one of the entitlement messages. The thus obtained encrypted control word $\{CW\}_{CSSK}$ can be decrypted using e.g. the decryption algorithm of the receiver hardware chip of FIG. 1.

The processing of FIG. 3 can be modified to create multiple key layers. The simplest form uses only a single layer, where all P values are distributed in a compound, tied with U (thus without any G). The case with two layers is given in FIG. 3. This adds a second group key layer, which makes it possible to combine multiple U's under a single G. This reduces the bandwidth required to distribute an update to P. Additional key levels require corresponding Remove Add stages. The main benefit of two (or more) key layers is that it reduces the bandwidth required to distribute keys to authorized receivers compared to a single layer key hierarchy.

An important problem in a key hierarchy—both in hardware and in software tamper resistance solutions—occurs when a subscriber discontinues a subscription and the corresponding receiver needs to be disabled. In the two layer key hierarchy of FIG. 3 this involves removing the G information from the receiver. An option is to send a new compound <G,U> to the disabled receiver. As delivery of the new compound is uncertain (a receiver can be turned off e.g.), the update message needs to be repeated. However, if an attacker can influence the generic processing environment, these update messages may be blocked which would cause the receiver to continue descrambling for a terminated subscription. To counter such an attack, it is necessary to change the actual value of G and distribute the new <G,U> values to all receivers in the group that have a valid subscription. This requires a potentially large number of updates to all remaining group members after a change to the subscriber status of a single group member. As message delivery is uncertain, the group key update messages need to be repeated. The update message cycle needs to be fast enough to allow a receiver that has not been connected to the conditional access stream for a longer period of time to quickly receive all necessary updates. Obviously, there are significant bandwidth issues with this type of entitlement processing.

An efficient mechanism to deal with a discontinued membership is the negative entitlement message. This is a message that informs a receiver to discontinue using a particular key. Obviously, it would be possible to block the reception of such a negative entitlement or to remove it from the storage. Even if the entitlement is not modified, the entitlement processing might be disabled. Hence, the system needs to enforce the reception and appropriate processing of negative entitlements.

In the invention, this is handled by splitting a lower level key into two or more subkeys. These subkeys need to be combined in the receiver before use in the key hierarchy. Moreover it is possible to split keys at other levels into two or more subkeys, which keys need to be combined in the receiver.

Figure 4:
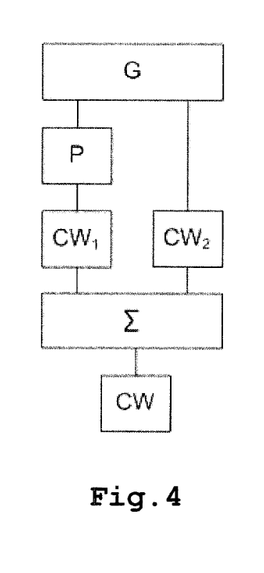
FIG. 4 shows a split CW key delivery process of an exemplary embodiment of the invention.

FIG. 4 shows an example of split key delivery for a lowest level CW key that is split into two subkeys CW1 and CW2. The key hierarchy of FIG. 4 shows that the "CW1" subkey is distributed under protection of "P". The "CW2" subkey is distributed under the protection of "G". "P" and "G" are keys in case of a hardware tamper resistance implementation or seeds in case of a software tamper resistance implementation. It is possible to use a "U" level instead of the "G" level for distributing the CW2 subkey. As the CW1 and CW2 subkeys both are needed for calculating the "CW", two parallel processing sequences generate the CW1 and CW2 subkeys. When a negative entitlement message is used to control obtainment of the "CW2" subkey, the "CW2" subkey is combined with a group membership vector and distributed under "G". In the receiver "G" is stored in combination with a membership number. During the processing of negative entitlement the membership number is used to verify membership in the membership vector. The result of the membership check is merged with the CW2 output. Next CW is obtained by combining CW1 and CW2.

Figure 5:
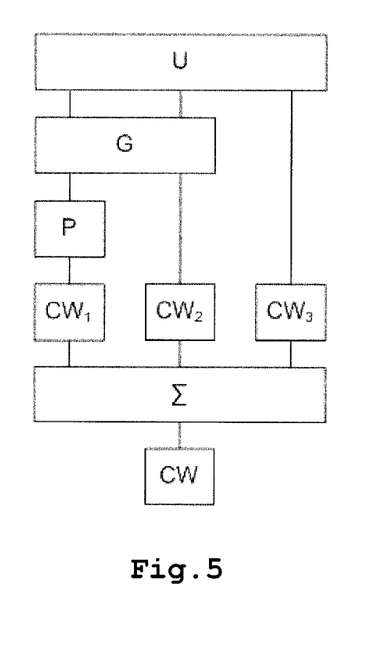
FIG. 5 shows a split CW key delivery process of an exemplary embodiment of the invention.

FIG. 5 shows an example of split key delivery for a lowest level CW key that is split into three subkeys CW1, CW2 and CW3. The key hierarchy of FIG. 5 shows that the "CW1" key is distributed under protection of "P". The "CW2" key is distributed under the protection of "G". The "CW3" key is distributed under protection of "U". "P", "G" and "U" are keys in case of a hardware tamper resistance implementation or seeds in case of a software tamper resistance implementation. As the CW1, CW2 and CW3 are all needed for calculating the "CW" key, three parallel processing sequences generate the CW1, CW2 and CW3 subkeys. When a negative entitlement message is used to control obtainment of the "CW2" subkey, the "CW2" subkey is combined with a group membership vector and is distributed under "G". In the receiver "G" is stored in combination with a membership number. During the processing of negative entitlement the membership number is used to verify membership in the membership vector. The result of the membership check is merged with the CW2 output. Similarly a group membership is verified with "U", which effectively verifies the membership in a group larger than the group defined by the group membership vector under "G". Next CW is obtained by combining CW1, CW2 and CW3.

Figure 6:
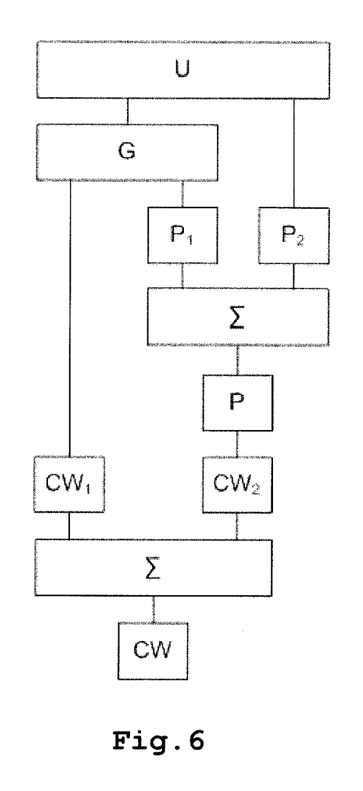
FIG. 6 shows a split CW key delivery process of an exemplary embodiment of the invention.

FIG. 6 shows an example of split key delivery for a lowest level CW key that is split into two subkeys CW1 and CW2. Moreover "P" is split into two subparts P1 and P2. The subparts P1 and P2 are subkeys in case of a hardware tamper resistance implementation or subseeds in case of a software tamper resistance implementation. As the P1 and P2 both are needed for calculating "P", two parallel processing sequences generate the P1 and P2 subparts. The "P1" subpart is distributed under the protection of "G". The "P2" subpart is distributed under protection of "U". "P", "G" and "U" are keys in case of a hardware tamper resistance implementation or seeds in case of a software tamper resistance implementation. When a negative entitlement message is used to control obtainment of the "P2" subpart, the "P2" subpart is combined with a group membership vector and is distributed under "U". In the receiver "U" is stored in combination with a membership number. During the processing of negative entitlement the membership number is used to verify membership in the membership vector. The result of the membership check is merged with the P2 output. Next "P" is obtained by combining P1 and P2. The "CW2" key is distributed under protection of "P". The "CW1" key is distributed under the protection of "G". As the CW1 and CW2 both are needed for calculating the "CW" key, two parallel processing sequences generate the CW1 and CW2 subkeys. When a negative entitlement message is used to control obtainment of the "CW1" subkey, the "CW1" subkey is combined with a group membership vector and is distributed under "G". In the receiver "G" is stored in combination with a membership number. During the processing of negative entitlement the membership number is used to verify membership in the membership vector. The result of the membership check is merged with the CW2 output. Next the "CW" key is obtained by combining CW1 and CW2.

Instead of a group membership vector any other group membership data can be used to indicate the membership of a receiver in a group. A paid subscription can e.g. result in a group membership. The group membership data effectively indicates whether or not a key or seed is to be revoked by the receiver. The group membership data is typically managed by a head-end system.

It is possible that the "CW" key obtained after combining the subkeys is in encrypted form and needs to be decrypted in a subsequent decryption process.

The invention is not limited to the presented examples. The split key processing can be used at any layer in the hierarchy and one or more keys or seeds can be split into any number of subparts. Typically at least two parallel calculation sequences are used: one for a first subpart of the key/seed distributed in a positive entitlement and one for a second subpart of the key/seed distributed in a negative entitlement.

The negative entitlement typically contains a membership table conveying the current group membership status. This is a shared message for all of the group members, i.e. all receivers in the group. For a group of size N, this amounts to a binary array of N bits. The receiver uses the unique group membership number as an index into the membership array to obtain the current membership status. The membership detection thus involves giving each member a unique number and separately distributing a negative entitlement with the membership table.

Figure 7:
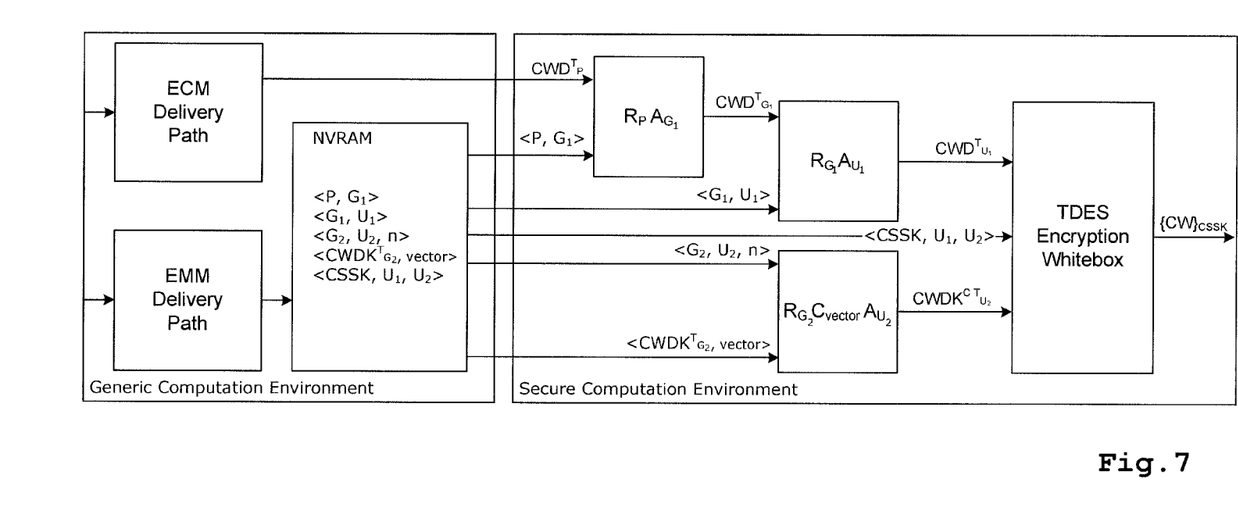
FIG. 7 shows Conditional Access key processing in a receiver using split key delivery of an exemplary embodiment of the invention.

An example of Conditional Access key processing in a receiver wherein the CW is split into subkeys and the membership check is coupled to entitlement processing is shown FIG. 7. The two level key hierarchy is similar to the one described in the example of FIG. 3. Additionally, the conditional entitlement processing uses a secure correlation instance to implement the group membership check. The result of correlation stage is the computation of a Control Word Difference Key CWDK. Both the CWDK subkey and the CWD subkey are needed to calculate the CW. The CW is calculated in the TDES Encryption Whitebox, typically by adding the CWDK value to the CWD value. Depending on the implementation other computations may be used to calculate CW from CWDK and CWD, such as e.g. multiplying CWDK and CWD, subtracting CWDK from CWD or applying any predefined function to CWDK and CWD. The TDES Encryption Whitebox encrypts the CW using the local CSSK. The additional calculation only needs to be performed after an EMM update to the CWDK compound <$CWDK^{TG2}$,vector> although more frequent re-calculations may occur. When there are no changes to the membership, the compound can remain unchanged. Still repetitions may be needed for receivers that have not yet received the most recent version of this compound. The CWDK compound is common to all members of the group. The unique element to the receiver is the membership group number 'n', which can stay unchanged. The conditional processing thus enables a lower conditional access data bandwidth as the CWDK compound is an efficient method to manage group membership.

The presented examples describe a conditional access system based on software tamper resistance technology. The invention is not limited to software tamper resistance environments and can be used in hardware tamper resistance environments as well. The invention can be used for hybrid conditional access receivers that use software entitlement processing for lower value content and smart card based entitlement processing for high value content.

The entitlement messages are typically transmitted from a single head-end system to a receiver. It is possible that the entitlement messages are transmitted from two or more head-end systems. In the latter case the obtainment of a valid CW is under control of all head-end systems, enabling each head-end system to revoke the CW by either not transmitting the required entitlement data, transmitting invalid entitlement data or transmitting group membership data reflecting the revocation of the CW.

Figure 8:
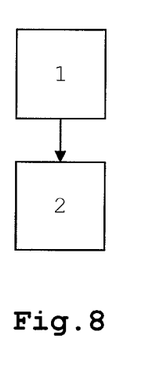
FIG. 8 shows the steps of a method for obtaining a control word in a receiver of an exemplary embodiment of the invention.

FIG. 8 shows the steps of a method for obtaining a control word as can be performed by a receiver as described above. In step 1 two or more subkeys, e.g. CW1 and CW2, are obtained. Each subkey is under control of an entitlement message received from a head-end system. In step 2 the subkeys CW1 and CW2 are combined to obtain the control word CW.

Figure 9:
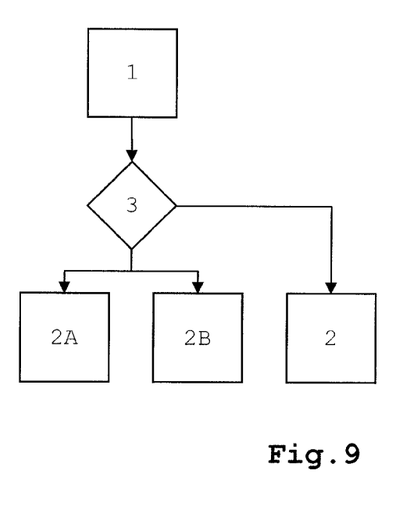
FIG. 9 shows the steps of a method for obtaining a control word in a receiver of an exemplary embodiment of the invention.

FIG. 9 shows the steps of a method for obtaining a control word as can be performed by a receiver as described above. In addition to the steps described for FIG. 8, in step 3 group membership data, indicated by "vector" in FIG. 7, is processed to determine for the receiver whether or not the control word CW is to be revoked. If the control word CW is to be revoked, the subkey that is under control of the negative entitlement message, e.g. CWDK in FIG. 7, obtainment of the subkey CWDK is disabling in step 2A or an invalid subkey CWDK is obtained in step 2B.

Figure 10:
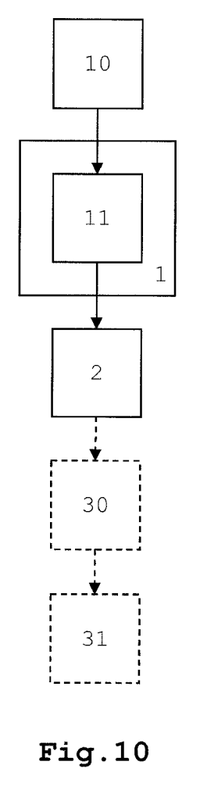
FIG. 10 shows the steps of a method for obtaining a control word in a receiver based on hardware tamper resistance technology of an exemplary embodiment of the invention.

FIG. 10 shows the steps of a method for obtaining a control word as can be performed by a receiver based on hardware tamper resistance technology as described above. In step 10 two or more encrypted subkeys are received, each encrypted under a respective decryption key, e.g. under the "P" key, "G" key and "U" key. In step 11 the encrypted subkeys are decrypted using the respective decryption keys P, G and U. Next the thus obtained subkeys are combined in step 2 to obtain the control word CW. Optionally the obtained control word is encrypted under a receiver unique key such as e.g. the CSSK. The encryption can be performed in the TDES Encryption Whitebox as shown in FIG. 7. In this case step 30 can be performed to obtain the receiver unique key (CSSK) and step 31 can be performed to decrypt the control word $\{CW\}_{CSSK}$ using the CSSK key. Steps 30 and 31 are e.g. performed by the chipset of FIG. 1. The dashed lines in FIG. 10 indicate that these steps are optional.

Figure 11:
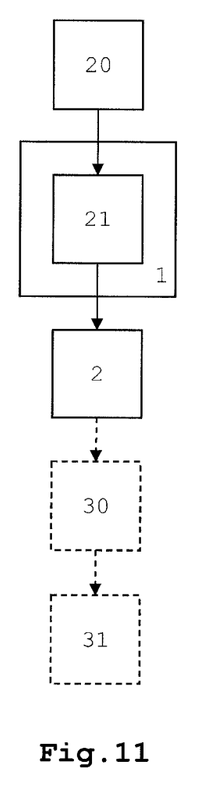
FIG. 11 shows the steps of a method for obtaining a control word in a receiver based on software tamper resistance technology of an exemplary embodiment of the invention.

FIG. 11 shows the steps of a method for obtaining a control word as can be performed by a receiver based on software tamper resistance technology as described above. In step 20 two or more transformed subkeys are received. In step 21 the transformed subkeys are transformed using seeds received in entitlement messages for each subkey. In case of e.g. three received subkeys CW1, CW2 and CW3 the seeds P, G and U can be used to transform each of the subkeys, respectively. Next the thus obtained subkeys are combined in step 2 to obtain the control word CW. As explained with FIG. 7 several transformation steps can be performed to obtain a subkey. Moreover, the combination step 2 is typically performed within the same block as where the last transformation step is performed to avoid transmission of a clear CW between blocks. This block is e.g. the TDES Encryption Whitebox module as shown in FIG. 7. Optionally the obtained control word is encrypted under a receiver unique key such as e.g. the CSSK. The encryption can be performed in the TDES Encryption Whitebox. In this case step 30 can be performed to obtain the receiver unique key (CSSK) and step 31 can be performed to decrypt the control word $\{CW\}_{CSSK}$ using the CSSK key. Steps 30 and 31 are e.g. performed by the chipset of FIG. 1. The dashed lines in FIG. 10 indicate that these steps are optional.

Figure 12:
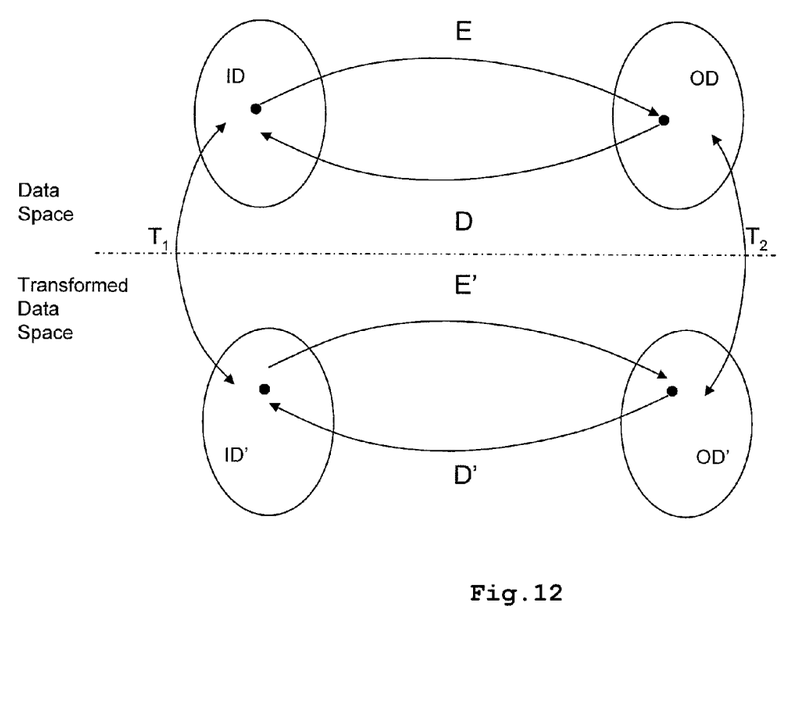
FIG. 12 shows a diagram clarifying transformation functions and encryption in general terms.

The concept of transformation functions and encryption is clarified in general with reference to FIG. 12.

Assume, there exists an input domain ID with a plurality of data elements in a non-transformed data space. An encryption function E using some key is defined that is configured to accept the data elements of input domain ID as an input to deliver a corresponding encrypted data element in an output domain OD. By applying a decryption function D, the original data elements of input domain ID can be obtained by applying the decryption function D to the data elements of output domain OD.

In a non-secure environment, an adversary is assumed to be able to control the input and output data elements and the operation of the implementation of the encryption function E, in order to discover the confidential information (such as keys) that is embedded in the implementation.

Additional security can be obtained in such a non-secured environment by applying transformation functions to the input domain ID and output domain OD, i.e. the transformation functions are input- and output operations. Transformation function T1 maps data elements from the input domain ID to transformed data elements of transformed input domain ID' of a transformed data space. Similarly, transformation function T2 maps data elements from the output domain OD to the transformed output domain OD'. Transformed encryption and decryption functions E' and D' can now be defined between ID' and OD' using transformed keys. T1 and T2 are bijections.

Using transformation functions T1, T2, together with encryption techniques implies that, instead of inputting data elements of input domain ID to encryption function E to obtain encrypted data elements of output domain OD, transformed data elements of domain ID' are input to transformed encryption function E' by applying transformation function T1. Transformed encryption function E' combines the inverse transformation functions $T1^{-1}$ and/or $T2^{-1}$ in the encryption operation to protect the confidential information, such as the key. Then transformed encrypted data elements of domain OD' are obtained. By performing T1 and/or T2 in a secured portion, keys for encryption functions E or decryption function D can neither be retrieved when analysing input data and output data in the transformed data space nor when analysing the white box implementation of E' and/or D'.

One of the transformation functions T1, T2 should be a non-trivial function. In case, T1 is a trivial function, the input domains ID and ID' are the same domain. In case, T2 is a trivial function, the output domains are the same domain.

What is claimed is:

1. A method in a receiver, the method comprising:
    receiving an entitlement control message (ECM) and an entitlement management message (EMM), the ECM including a first subkey, the EMM including a second subkey, a membership data, and a receiver unique key;
    decrypting or transforming the first subkey under control of the EMM; and either:
        (a) in response to determining, based on the membership data, that a control word is invoked:
            decrypting or transforming the second subkey under control of the EMM,
            combining the decrypted or transformed second subkey with the decrypted or transformed first subkey to obtain the control word; or
        (b) in response to determining, based on membership data, that the control word is revoked:
            obtaining an invalid second subkey,
        combining the invalid second subkey with the decrypted or transformed first subkey to obtain an invalid control word.

2. The method according to claim 1, wherein the membership data indicates for a group having the receiver whether or not the control word is to be revoked, the method further comprising:

processing the group membership data to determine for the receiver whether or not the control word is to be revoked; and in response to determining that the control word is to be revoked, disabling the decryption or transformation of the second subkey.

3. The method according to claim 1, further comprising:
receiving decryption keys in at least one of the ECM and EMM; and
decrypting each of the first and second subkeys using the respective decryption keys,
wherein the receiver comprises hardware tamper resistance technology.

4. The method according to claim 3, wherein one or more of the decryption keys is obtained by combining two or more decryption subkeys each obtained under control of at least one of the ECM and EMM.

5. The method according to claim 1, further comprising:
receiving seeds in the at least one of the ECM and EMM; and
transforming each of the first and second subkeys using the respective seeds,
wherein the receiver comprises software tamper resistance technology.

6. The method according to claim 5, wherein one or more of the seeds is obtained by combining two or more subseeds each obtained under control of at
least one of ECM and EMM.

7. The method according to claim 1, comprising:
encrypting the control word with a local key.

8. A receiver comprising:
an input module configured for receiving an entitlement control message (ECM) and an entitlement management message (EMM), the ECM including a first subkey, the EMM including a second subkey, a membership data, and a receiver unique key; and
a processor configured to:
(a) decrypt or transform the first subkey under control of the EMM;
(b) in response to determining, based on the membership data, that a control word is invoked:
decrypt or transform the second subkey under control of the EMM,
combine the decrypted or transformed second subkey with the decrypted or transformed first subkey to obtain the control word; and
(c) in response to determining, based on the membership data, that the control word is revoked:
obtain an invalid second subkey,
combine the invalid second subkey with the decrypted or transformed first subkey to obtain an invalid control word.

9. The receiver according to claim 8, wherein the membership data indicates for a group having the receiver whether or not the control word is to be revoked, wherein the processor is further configured to:
process the group membership data to determine for the receiver whether or not the control word is to be revoked, and block the decryption or transformation of the second subkey.

10. The receiver according to claim 8, comprising hardware tamper resistance technology, wherein the input module is configured to:
receive decryption keys in at least one of the ECM and EMM, and
wherein the processor is configured to:
decrypt each of the first and second subkeys using the respective decryption keys.

11. The receiver according to claim 10, wherein the processor is further configured to obtain one or more of the decryption keys by combining two or more decryption subkeys each obtained under control of at least one of the ECM and EMM.

12. The receiver according to claim 8, comprising software tamper resistance technology, wherein the input module is configured to:
receive seeds in at least one of the ECM and EMM, and
wherein the processor is configured to:
transform each of the first and second subkeys using the respective seeds.

13. The receiver according to claim 12, wherein the receiver is further configured to obtain one or more of the seeds by combining two or more subseeds each obtained under control of at least one of the ECM and EMM.

14. The receiver according to claim 8, comprising a hardware decryption block configured to decrypt the encrypted control word using the receiver unique key.

15. The receiver according to claim 8, wherein the processor is configured to:
encrypt the control word with a local key.

16. A non-transitory computer readable storage medium storing one or more programs, the one or more programs comprising instructions, which when executed by a computer processor, cause the computer processor to perform a method comprising:
receiving an entitlement control message (ECM) and an entitlement management message (EMM), the ECM including a first subkey, the EMM including a second subkey, a membership data, and a receiver unique key;
decrypting or transforming the first subkey under control of the EMM; and either:
(a) in response to determining, based on the membership data, that a control word is invoked:
decrypting or transforming the second subkey under control of the EMM,
combining the decrypted or transformed second subkey with the decrypted or transformed first subkey to obtain the control word; or
(b) in response to determining, based on the membership data, that the control word is revoked:
obtaining an invalid second subkey,
combining the invalid second subkey with the decrypted or transformed first subkey to obtain an invalid control word.

* * * * *